_United States Patent Office_

3,207,761
Patented Sept. 21, 1965

3,207,761
3-NITRO-2-ISOXAZOLINE AND ITS PRODUCTION
Paul G. Bay, Skokie, Ill., assignor to Abbott Laboratories, North Chicago, Ill., a corporation of Illinois
No Drawing. Filed Mar. 1, 1963, Ser. No. 262,257
8 Claims. (Cl. 260—307)

This application is a continuation-in-part of U.S. Serial No. 152,146, filed November 14, 1961, which is now abandoned.

The present application relates to a new heterocyclic compound; more particularly it relates to 3-nitro-2-isoxazoline and the process for its manufacture.

The new 3-nitro-2-isoxazoline is a very powerful antibacterial and fungicide, highly active against molds, bacteria and dermatophytes, i.e. a solution containing less than 25 parts per million of 3-nitro-2-isoxazoline completely inhibits the in-vitro growth of *Candida albicans, Epidermophyton flocossum, Microsporum canis, Microsporum fulvum, Trichophyton gypseum, Trichophyton mentagrophytes, Chaetomium globosum, Myrothecium verrucaria, Asperigillus versicolor, Penicillium citrinum, Fusarium oxysporum,* Alternaria, *Staphylococcus aureus, Pseudonomas aeruginosa, Salmonella typhimurium, Proteus vulgaris, Proteus mirabilis, Echerichia coli,* and others. Since 3-nitro-2-isoxazoline is only sparingly soluble in water, organic solvents are best suited for the production of a fungicidal or antibacterial solution. For example, 3-nitro-2-isoxazoline may be dissolved in a 5% aqueous dimethylformamide solution, in alcohol, aqueous alcohol or similar solvents or solvent mixtures. The new compound can also be dissolved in almost any inert solvent alone, e.g., in hydrocarbon solvents such as benzene, kerosene, pentane, cyclohexane, or in N,N-disubstituted acid amides, ethers, alcohols, and esters. Such a straight organic solution is of great importance, for instance as a fuel additive, particularly in view of the high potency of the new compound as a fungicide and bactericide. Thus, a solution containing one part of 3-nitro-2-isoxazoline in 100,000 parts of a liquid comprising between 5% and 100% of an inert, organic liquid and 95–0% of water, completely inhibits the growth of the above-listed and other micro-organisms. Since only such a minute quantity of 3-nitro-2-isoxazoline has to be dissolved to obtain an effective bactericidal or fungicidal liquid, the solubility of the new liquid organic compounds in the inert organic solvent chosen can be very small. Obviously, a surface-active agent or an emulsifier or coloring matter and/or other additives can be used in conjunction with such a bactericidal solution if desired. If is to be understood from the term "inert," used hereinabove, that the organic solvent only dissolves the active compound while it does not chemically react with it or the other solvent or solvents present in the system.

In a brief outline of the process for making 3-nitro-2-isoxazoline, a disubstituted propane of the formula R—CH$_2$CH$_2$CH$_2$R′ wherein R is iodine, bromine, chlorine or the nitro group, and wherein R′ is iodine, bromine or chlorine, is stirred for several hours with an alkali metal nitrite in an inert solvent in which the alkali metal nitrite is at least partially soluble. The reactants are preferably used in an equimolar proportion, i.e. about two moles of alkali metal nitrite to one mole of the propane derivative defined above. Particularly suitable propane derivatives for the process of making 3-nitro-2-isoxazoline are 1-chloro-3-iodopropane, 1-chloro-3-bromopropane, 1,3-dichloropropane, 1,3-dibromopropane, 1-bromo-3-iodopropane, 1-chloro-3-nitropropane, 1-bromo-3-nitropropane, and 1-iodo-3-nitropropane on the one hand, and sodium nitrite or potassium nitrite on the other hand. To those skilled in the art it will be obvious that other alkali metal nitrites may be used instead of sodium nitrite or potassium nitrite.

The process of manufacturing 3-nitro-2-isoxazoline is carried out in the presence of any inert solvent that dissolves at least about 2% of sodium nitrite or potassium nitrite at room temperature. The term "inert" is used herein to express that such a solvent does not react with any of the starting materials or with 3-nitro-2-isoxazoline. Among the solvents useful as reaction media are dimethylformamide, dimethylacetamide, water, N-methylpyrrolidone, methanol, ethanol, dimethylsulfoxide or mixtures thereof.

The following examples are added in order to illustrate the preparation of 3-nitro-2-isoxazoline. However, it is to be understood that these examples are illustrations only and are not meant to limit the invention in any form other than recited in the appended claims.

*Example 1*

A mixture of 314.9 grams of 1-chloro-3-bromopropane, 1.5 liters of dimethylformamide, and 283 grams of sodium nitrite is stirred overnight while the temperature is kept between 8° and 25° C. by cooling with an ice bath. Thereafter, the dimethylformamide is removed by distillation at a pressure of 18 mm. Hg. The residue, a yellow liquid and some insoluble material, is diluted with 600 ml. of water and the oil phase is separated. The aqueous layer is extracted with three 200-ml. portions of benzene and this extract is combined with the above organic phase. The benzene is stripped at atmospheric pressure or a water-bath and the residual liquid is fractionated. The fraction boiling at 5.5 mm. Hg pressure and 105–9° C. is identified as 3-nitro-2-isoxazoline. It shows a $n_D{}^{25}$ of 1.5042 and analyzes 31.05% C, 3.50% H, 24.09% N, and 41.1% O, corresponding to the calculated values of 3-nitro-2-isoxazoline. This compound is obtained in a yield of 121.0 grams or 52.3% of theory. The nuclear magnetic resonance, infrared absorption spectrum, ultraviolet absorption spectrum, molecular weight determination and reaction studies all prove the new compound to have the structure of 3-nitro-2-isoxazoline.

*Example 2*

To a stirred mixture of 138 grams of sodium nitrite in 700 ml. of methanol, 157.5 grams of 1-chloro-3-bromopropane is added dropwise. The mixture is stirred under reflux overnight and subsequently the solvent is distilled. The residue is quenched with water and extracted with ether. After drying the ether solution with sodium sulfate, the ether is evaporated on a water bath. The residue is fractionated, yielding 24% of the theoretical amount of 3-nitro-2-isoxazoline.

*Example 3*

A mixture of 48 grams (76% pure) of 1-chloro-3-nitropropane and 54 grams of sodium nitrite is stirred in 300 ml. of dimethylformamide at 1–10° C. for 17 hours. The mixture is filtered and the solvent is stripped from the filtrate by distillation under reduced pressure. The residue is dissolved in ether, filtered, and the ether is removed by distillation. The yellow, liquid residue is fractionated to give 22% of the theoretical amount of 3-nitro-2-isoxazoline.

In a repetition of this example, the dimethylformamide is replaced with dimethylacetamide to produce substantially the same result.

*Example 4*

To a mixture of 69.1 grams of sodium nitrite and 235 ml. of N-methylpyrrolidone, 78.8 grams of 1-chloro-3-bromopropane is added in small portions while stirring. The addition is completed within 20 minutes while the temperature rises rapidly. When 80° C. is reached, the solution is cooled with an ice bath until it reaches a temperature of 67° C. Thereafter, the mixture is stirred for 13 hours without cooling. After a final 30-minute heating period at 120–24° C., the solvent is removed and the residue is fractionated to yield 40% of the theoretical amount of 3-nitro-2-isoxazoline.

*Example 5*

A mixture of 157.5 grams of 1-chloro-3-bromopropane, 138 grams of sodium nitrite, and one liter of water is heated and stirred on a steam bath for 17½ hours at 95° C. After cooling, the oily layer is separated from the mixture and fractionated to yield 24% of the theoretical amount of 3-nitro-2-isoxazoline.

*Example 6*

Into a stirred mixture of 96 grams of sodium nitrite, 10.5 grams of potassium iodide, and 3 iodine crystals in 740 ml. of ice-cooled dimethylformamide, 83.5 grams of 1,3-dichloropropane is dropwise added within a period of 2 hours. The mixture is stirred at room temperature for 16 hours and subsequently heated for 15 minutes. An exothermic reaction ensues and the temperature rises rapidly to about 140° C. for a short period and subsequently the temperature reduces within a few minutes to about 70° C. The mixture is then heated on a steam bath for 2½ hours and subjected to fractionation, yielding 21% of the theoretically expected amount of 3-nitro-2-isoxazoline.

*Example 7*

To a solution of 204 grams of 1-chloro-3-iodopropane in 2 liters of dimethylformamide, 138 grams of sodium nitrite is added in portions over a period of 7 minutes while stirring. After completion of the addition, the temperature rises to 45° within 10 minutes. The mixture is cooled with an ice bath and stirred for 16 hours at room temperature, after which time it is poured into 5 liters of water. The organic components in this solution are extracted with ether. This ether solution is decolorized with dilute, aqueous sodium bisulfite, dried with magnesium sulfate, and evaporated. Fractionation of the crude residue yields 26.8% of the theoretical amount of 3-nitro-2-isoxazoline.

The process of the present invention can be carried out within a wide temperature range, e.g. from about 0° to about 150° C. However, since the formation of 3-nitro-2-isoxazoline is an exothermic reaction, overheating may occur when the reactants are brought together in bulk at elevated temperatures. Therefore, for best results, the reactants are brought together at low temperature and the mixture is stirred for several hours at room temperature or below, while the reaction is then completed at higher temperatures, or, overheating may be avoided by slowly adding one of the reactants, e.g., 1-nitro-3-halopropane or 1,3-dihalopropane, to the preheated alkali metal nitrite solution, or by adding the alkali metal nitrite solution to the preheated organic reactant. The maximum temperature to be used in this reaction obviously depends upon the choice of the reaction medium, but even a relatively low-boiling inert solvent may be used where higher temperatures are desired for completion of the reaction by carrying out this process in a closed reaction vessel, i.e. under autogenous pressure.

The process of the present invention proceeds through a number of intermediates which convert in situ to the 3-nitro-2-isoxazoline. Among these intermediates are the 1-nitro-nitroso-2-propene and the 1-nitro-1-nitroso-3-chloropropane. Both of these intermediates obviously could also be used as the starting materials for the manufacture of 3-nitro-2-isoxazoline in place of the above-identified 1,3-dihalopropane or 1-nitro-3-halopropane.

Others may practice the invention in any of the numerous ways which will be suggested to one skilled in the art by the present disclosure. All such practice of the invention is considered to be a part hereof provided it falls within the scope of the appended claims.

I claim:
1. 3-nitro-2-isoxazoline.
2. The method of preparing 3-nitro-2-isoxazoline comprising the step of
  reacting a propane derivative of the formula

$$R-CH_2CH_2CH_2R'$$

wherein R is selected from the group consisting of bromine, iodine and chlorine, and wherein R' is selected from the group consisting of chlorine, bromine, iodine and nitro, with an alkali metal nitrite in the presence of an inert solvent.
3. The process of claim 2 wherein for each mole of said propane derivative, about two moles of alkali metal nitrite are used.
4. The process of claim 2 wherein said inert solvent is dimethylformamide.
5. The process of claim 2 wherein said alkali metal nitrite is sodium nitrite.
6. The process of claim 2 wherein said propane derivative is 1-bromo-3-chloropropane.
7. The process of making 3-nitro-2-isoxazoline comprising the steps of
  admixing one mole of a propane derivative of the formula $R-CH_2CH_2CH_2R'$ wherein R is selected from the group consisting of bromine, iodine and chlorine, and wherein R' is selected from the group consisting of chlorine, bromine, iodine and nitro, with about two moles of sodium nitrite, in the presence of dimethylformamide,
  intermixing said reactants for several hours,
  removing said dimethylformamide from the reaction mixture, and
  fractionating the resulting residue.
8. The process of claim 7, wherein said reactants are stirred together several hours at a temperature between 0° C. and room temperature followed by several hours of stirring at a temperature between room temperature and 150° C.

References Cited by the Examiner

UNITED STATES PATENTS

| | | | |
|---|---|---|---|
| 2,718,520 | 9/55 | Slack | 260—307.6 |
| 2,808,412 | 10/57 | Jeffreys | 260—307.6 |
| 2,852,427 | 9/58 | Eden | 167—33 |
| 2,960,433 | 11/60 | Eden | 167—33 |

NICHOLAS S. RIZZO, *Primary Examiner.*